United States Patent
Bar-Or

(10) Patent No.: US 9,626,179 B2
(45) Date of Patent: Apr. 18, 2017

(54) METHOD AND SYSTEM FOR USING A ROM PATCH

(71) Applicant: SanDisk Technologies Inc., Plano, TX (US)

(72) Inventor: Shahar Bar-Or, Raanana (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/336,528

(22) Filed: Jul. 21, 2014

(65) Prior Publication Data

US 2016/0019036 A1   Jan. 21, 2016

(51) Int. Cl.
  *G06F 9/44* (2006.01)
  *G06F 9/445* (2006.01)
(52) U.S. Cl.
  CPC ..................... *G06F 8/66* (2013.01)
(58) Field of Classification Search
  CPC .................. G06F 12/00; G06F 11/07
  See application file for complete search history.

(56) References Cited

U.S. PATENT DOCUMENTS

| | | | | |
|---|---|---|---|---|
| 8,468,516 B1 * | 6/2013 | Chen | ........................ | G06F 8/67 707/687 |
| 8,762,980 B1 | 6/2014 | Sobel | | |
| 2004/0210720 A1 * | 10/2004 | Wong | ........................ | G06F 8/60 711/132 |
| 2005/0188258 A1 * | 8/2005 | Zweifel | ..................... | G06F 8/65 714/23 |
| 2006/0156297 A1 | 7/2006 | Joest | | |
| 2008/0184072 A1 * | 7/2008 | Odlivak | .............. | G06F 11/3644 714/32 |
| 2009/0064124 A1 | 3/2009 | Chung | | |
| 2011/0161949 A1 | 6/2011 | Kodaka | | |
| 2014/0108703 A1 * | 4/2014 | Cohen | ................... | G06F 3/0616 711/103 |
| 2014/0189673 A1 | 7/2014 | Stenfort | | |

(Continued)

OTHER PUBLICATIONS

Sherwood et al. (Patchable Instruction ROM Architecture, Department of Computer Science and Engineering University of California, 2001).*

(Continued)

*Primary Examiner* — Li B Zhen
*Assistant Examiner* — Lenin Paulino
(74) *Attorney, Agent, or Firm* — Brinks Gilson & Lione

(57) ABSTRACT

A method and system for using a ROM patch are provided. In one embodiment, a computing device obtains an original assembly code and a modified assembly code which is a modified version of the original assembly code, the original assembly code being used for an executable code which is stored in a ROM of a device. The computing device compares the original assembly code and the modified assembly code to identify difference(s) in the modified assembly code with respect to the original assembly code. The computing device then compiles the difference(s) (sometimes, after adjusting the differences) and generates a ROM patch by converting the compiled difference(s) into a replacement executable code for some of the executable code stored in the ROM of the device. In another embodiment, a method and system for using a ROM patch are disclosed.

25 Claims, 9 Drawing Sheets

(56) References Cited

U.S. PATENT DOCUMENTS

2015/0186150 A1  7/2015  Chung

OTHER PUBLICATIONS

Sherwood et al., "Patchable Instruction ROM Architecture," *Department of Computer Science and Engineering University of California*, 2001, 10 pages.
Office Action for U.S. Appl. No. 14/336,484 dated Oct. 21, 2015, 14 pages.
Office Action for U.S. Appl. No. 14/336,484 dated Mar. 18, 2016, 16 pages.
Notice of Allowance for U.S. Appl. No. 14/336,484 dated Jun. 7, 2016, 7 pages.

* cited by examiner

METHOD AND SYSTEM FOR USING A ROM PATCH

BACKGROUND

Some electronic devices, such as storage modules, have read-only memory (ROM) storing executable code. While executable code can instead be stored in non-volatile memory (e.g., Flash) and read into random-access memory (RAM) for execution, ROM is less expensive and has higher performance and lower power consumption than RAM. Because ROM is read-only, ROM is ideal for executable code that has been developed to maturity, where no changes are expected. However, in a quick-development-time environment where code is written quickly, changes to the executable code written in ROM may be needed if product requirements change and/or if bugs are found. In such situations and when the device is a system built of discrete components, the ROM chip may need to be removed from the device and replaced with a new ROM chip containing the modified code. This process may be impractical and expensive when the device is already deployed in the field. Further, if the device is an integrated circuit with integrated ROM, modifying the ROM can be an expensive and lengthy process that involves an additional tape-out.

To avoid ROM replacement, the executable code can be written so that any function that is subject to change can be called in an indirect way via function pointers stored in RAM. In this method, known as function vectoring, whenever a function needs to be modified, a replacement function is created and loaded to RAM, and the function pointers are changed to point to the replacement function instead of the original function in ROM. However, function vectoring can be very inefficient, as the full function needs to be replaced even if a single line in the function is changed. Also, because there is no a-priori knowledge of which functions may change in the future, function pointers are used for all the functions, which require a large amount of RAM.

OVERVIEW

Embodiments of the present invention are defined by the claims, and nothing in this section should be taken as a limitation on those claims.

By way of introduction, the below embodiments relate to a method and system for generating a ROM patch. In one embodiment, a computing device obtains an original assembly code and a modified assembly code which is a modified version of the original assembly code, the original assembly code being used for an executable code which is stored in a ROM of a device. The computing device compares the original assembly code and the modified assembly code to identify difference(s) in the modified assembly code with respect to the original assembly code. The computing device then compiles the difference(s) (sometimes, after adjusting the differences) and generates a ROM patch by converting the compiled difference(s) into a replacement executable code for some of the executable code stored in the ROM of the device.

The below embodiments also relate to a method and system for using a ROM patch. In one embodiment, an address in a command to read a line of the executable code from the ROM is analyzed to determine if the address is in a ROM patch table. In response to determining that the address is not in the ROM patch table, the line of the executable code is read from the addresses in the ROM. In response to determining that the address is in the ROM patch table, a replacement address in a ROM patch is read instead of the line of the executable code from the addresses in the ROM.

Other embodiments are possible, and each of the embodiments can be used alone or together in combination. Accordingly, various embodiments will now be described with reference to the attached drawings.

DETAILED DESCRIPTION OF EXEMPLARY EMBODIMENTS

Figure 1:
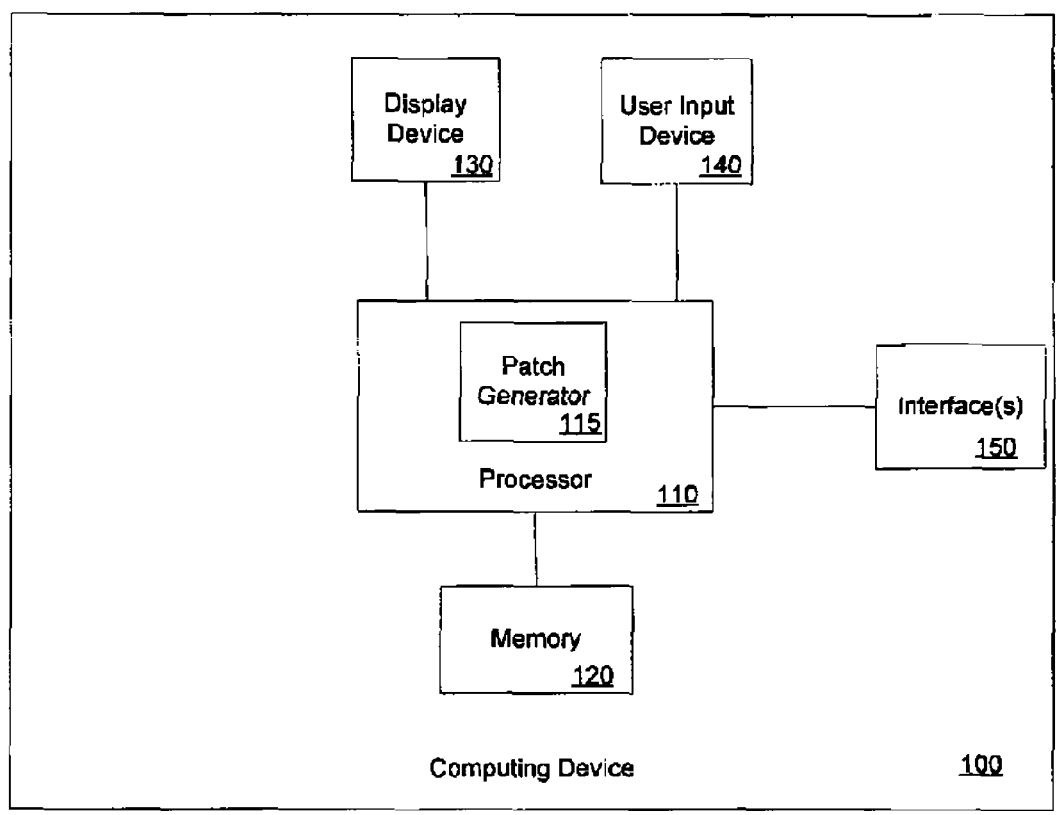
FIG. 1 is a block diagram of an exemplary computing device of an embodiment.

The following embodiments provide a method and system for generating a ROM patch and for using the ROM patch. These embodiments can be used to generate a ROM patch in a way that is less expensive, less complex, and more efficient than prior ways of generated a ROM patch. In one embodiment, the ROM patch is created on a computing device 100 (see FIG. 1) in the development process of a device. As shown in FIG. 1, the computing device 100 in one embodiment comprises a processor 110 (which implements a patch generator 115), memory 120, a display device 130, a user input device 140, and an interface(s) 150 through which the computing device 100 can communicate with an external device (e.g., in a wired or wireless fashion). The computing device 100 can include other components (e.g., an audio output, input-output ports, etc.) that are not shown in FIG. 1 to simplify the drawing. The computing device 100 can take any suitable form and, in one embodiment, is a mobile or desktop personal computer that is used as a development workstation.

As mentioned above, after executable code is stored in a ROM of a device, it is sometimes necessary to create a ROM patch to fix bugs and/or to adapt the code to new device requirements. To create a ROM patch, a programmer could write individual lines of replacement executable code, but that can be a lengthy, complex, error-prone process. To avoid such problems, this embodiment allows the programmer to modify the original high-level source code, which is easier for the programmer to work in than executable code, and then generate the ROM patch based on that modification. Because the programmer modifies the ROM code by writing in a high-level language, the programmer does not need an intimate understanding of the low-level representation of the code and the behavior of the underlying processor and hardware platform. Instead, the manual part of writing a patch may be done by a programmer in a high-level language, and the process of incorporating the patch into the run-time code is done automatically and seamlessly by the computing device 100, which can accelerate development time. Another advantage associated with these embodiments is that the ROM patch can be used to upgrade software without replacing hardware. Often, hardware (either a chip or a system) is already deployed in the field or embedded in a device (e.g., a mobile phone or computer) and cannot be replaced, even though a software upgrade is a common procedure. A ROM patch can be used to upgrade the software without replacing the hardware.

Figure 2:
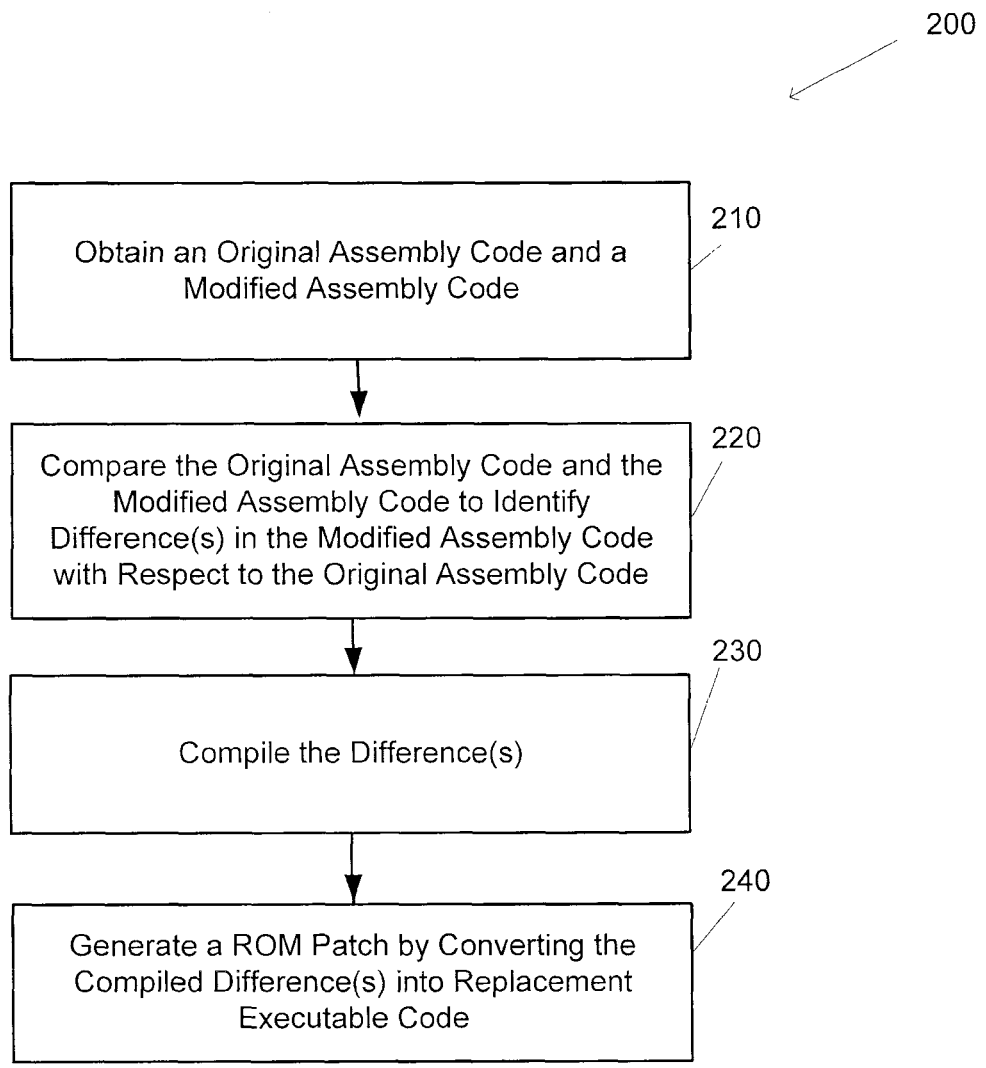
FIG. 2 is a flow chart of a method of an embodiment for generating a ROM patch.

FIG. 2 is a flow chart 200 of a method for generating a ROM patch in this embodiment. As shown in FIG. 2, the computing device 300 obtains an original assembly code and a modified assembly code (act 210). The original assembly code is used for executable code that is stored in a ROM of a device, and the modified assembly code is a modified version of the original assembly code. The computing device 100 can obtain either or both of the codes in any suitable way. For example, in one embodiment the computing device 100 receives either or both of the codes via the interface(s) 150 (e.g., a physical media (e.g., a USB drive) input or a network connector (e.g., when downloading the code from a network drive)). Alternatively, if the computing device 100 was used by the developer to type-in the original and modified source codes via the user input device 140 (e.g., keyboard) or if the computing device's memory 120 otherwise stores the original and modified source codes, the computing device 100 can obtain the original and modified assembly codes by compiling the stored original and modified source codes. These alternatives are examples of how "means for obtaining the assembly codes" can be implemented. Also, it should be understood that the phrase "memory configured to store an original assembly code and a modified assembly code" specifies that the memory is configured to store the code(s) and does not imply when and how much of the code(s) are stored in memory at any given time. For example, as noted above, the code(s) can be pre-stored in memory or can be transferred, in whole or in part (such as when the method works on a code portion-by-portion basis), to the memory.

The computing device 100 then compares the original assembly code and the modified assembly code to identify difference(s) in the modified assembly code with respect to the original assembly code (act 220). Next, the computing device 100 compiles only the difference(s) (act 230) (as will be discussed below, the difference(s) can be compiled after they are adjusted) and generates a ROM patch by converting the compiled difference(s) into a replacement executable code for some of the executable code stored in the ROM of the device (act 240). This results in a ROM patch that contains replacement executable code for some of the executable code stored in the ROM of the external (target) device. The same or different computing device can then be used to store the ROM patch in non-volatile memory of the external device (e.g., the computing device 100 can load the ROM patch to another device via its interface(s) 150).

Figure 3:
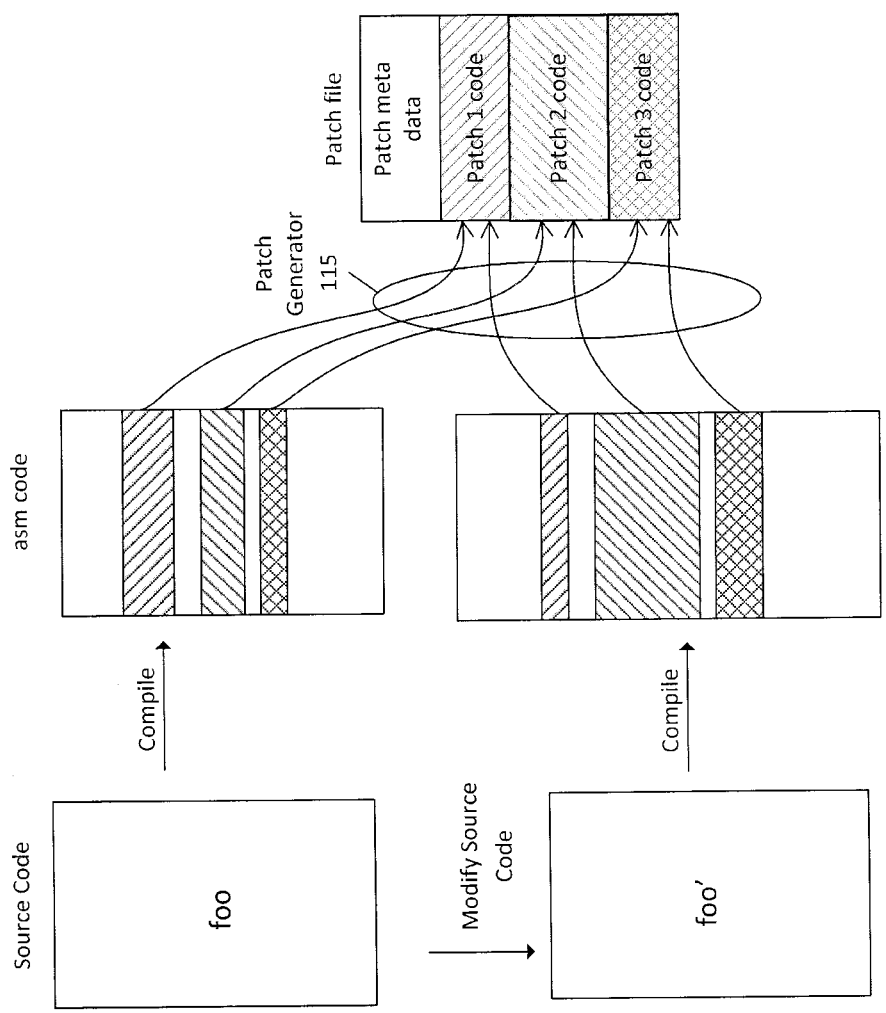
FIG. 3 is an illustration of an operation of a patch generator of an embodiment.

FIG. 3 is an example of generating a ROM patch according to this embodiment. In this example, suppose function foo in the ROM of a device contains a bug, and a programmer desires to continue to use the majority of foo from the ROM but wants to create a patch that contains replacement executable code for the portion of the executable code stored in the storage module's ROM that contains the bug. In this embodiment, the programmer writes a replacement function foo' in a high-level language (source code), and the original source code (foo) and the modified source code (foo') are compiled to create original and modified assembly code, respectively.

As shown in FIG. 3, the computing device 100 is configured with a "patch generator" 115 that generates a ROM patch by comparing the two assembly codes. (As noted above, the generation of the source code and/or the compilation of the source code can be done on the computing device 100 or on another device and later provided to the computing device 100. So, the computing device 100 can be used just for patch generation or also for the generation and compiling of the source code.) The patch generator 115 can take the form of computer-readable code stored in the computing device's memory 120 and executed by the computing device's processor 110. Alternative, the patch generator 115 can be a separate hardware component in the computing device 100. Either structure can be used to implement this means of comparing, and examples of the functionality implemented by these structures is described below and in conjunction with the flow charts in the figures.

The patch generator 115 compares the two assembly codes to identify how they are different and then compiles only those portion(s) of the modified assembly code that are different from the original assembly code. As will be discussed in the following examples, in some situation, a code difference may not be part of the patch. Also, in other situations, the code difference(s) can be adjusted before they are compiled, so they run correctly in the context of the patched code (e.g., by adjusting relative jump address from the patch to outside the patch and placing a jump-back to the next address following the patched code). The examples will now be described.

As discussed above, whenever the patch generator identifies that foo' is different than foo, it will generate a patch with its metadata (an entry point for the patch in the patch table, that will result with a jump command to the beginning of the patch in run-time). However, not every place where foo and foo' contain different content represents a real difference between the two. As such, the patch generator can apply a smart "diff" function between the two functions foo and foo' to identify their differences. The smart diff function can take into account that when operating foo' by adding a patch to foo, foo' may need to be modified according to the addresses occupied by foo in the ROM 116 and the addresses occupied by the patch in the RAM 116.

Figure 4A:
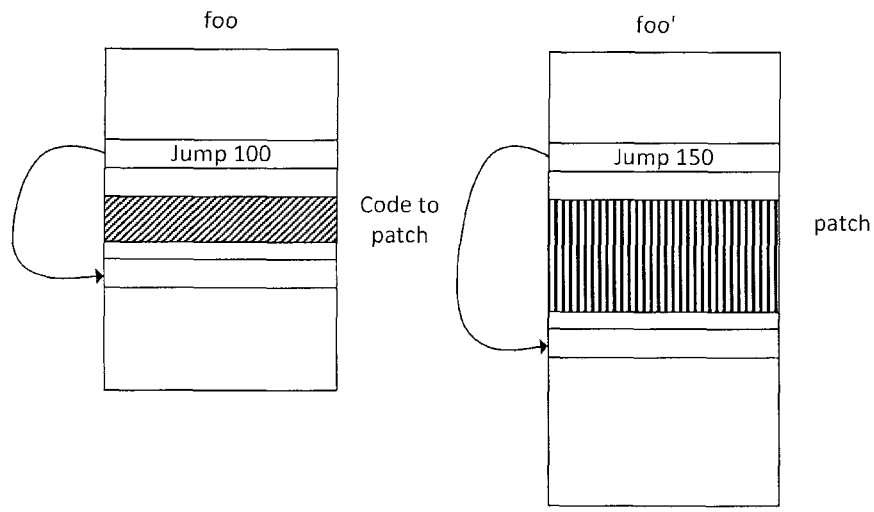
FIGS. 4A and 4B are illustrations of comparisons of assembly codes of compiled original and modified source codes of an embodiment.

For example, with reference to FIG. 4A, suppose foo and foo' differ in that foo includes the lines of "Code to patch," whereas foo' instead contains "patch." Another apparent difference occurs just below the patch where foo has the command of "jump 100," and foo' contains the command "jump 150." At first sight, the two commands are different, and the entry to the patch should be moved to this earlier point. However, in this case, this is not a real difference, as both commands create a jump to the same entry that contains the same data, even though they appear at different places in foo and foo' (because the length of the code to be replaced is different in size from the replacement code). Therefore, in this case, the command "jump 100" may be executed from the original foo, and there is no need to begin a patch at this point (i.e., differences in addresses in jump commands are ignored if the different addresses contain the same data— irrespective of what the data actually is (e.g., a line of code, firmware instructions, user data, etc.)).

Figure 4B:
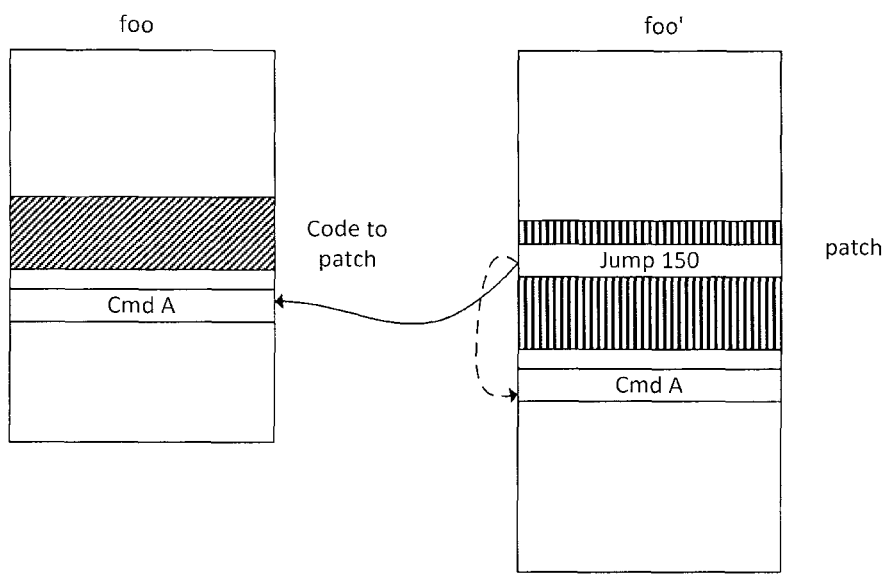

Another example is illustrated in FIG. 4B. As shown in FIG. 4B, the "jump 150" command from within the patch in foo' refers to Cmd A, which is not in the patch, but is contained in the original foo which resides in the ROM of the device. In this instance, the patch generator 115 can change the attribute of the jump command such that it will point to Cmd A in the original foo residing in the ROM and not to Cmd A of the function foo', which will not exist in the RAM during execution (i.e., modifying an address in a jump command in the replacement assembly code to point to an address in the original assembly code, if the address in the original assembly code contains the same data). Also, sometimes several addresses that are too long to be stored as a simple command attribute can be stored towards the end of the code, and whenever they are required as attributes to a command, the command can contain a pointer to these variables. The relative addresses of these variables may change when a patch is created, and the patch manager can take this into account as well.

Figure 5:
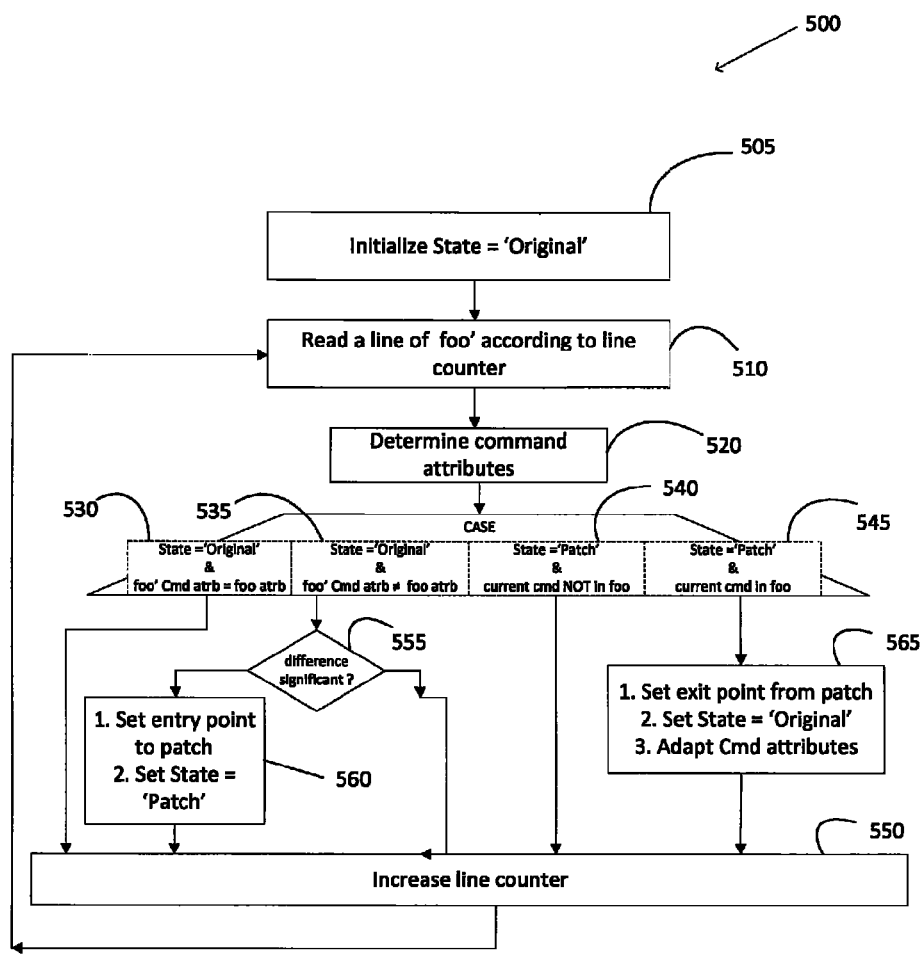
FIG. 5 is a flow chart of a method for creating patch metadata of an embodiment.

The patch generator 115 can create a patch metadata file specifying the entry and exit points for the patch taking into account the above considerations, and FIG. 5 is a flow chart 500 of one method for doing so using a state parameter. As shown in FIG. 5, the state parameter is initialized to the "Original" state (act 505). The patch generator 115 then reads a line of foo' according to a line counter (act 510) and determines the command attributes (act 520). In this example, there are four cases: state equals "Original" and foo' command attribute equals the foo attribute (530), state equals "Original" and foo' command attribute does not equal the foo attribute (535), state equals "Patch" and the current command is not in foo (540), and state equals patch and the current command is in foo (545). In cases 530 and 540, the line counter is increased (act 550), and the next line is read (act 505). In case 535, the patch generator 115 determines if the difference is significant (act 555). If it is, the patch generator 115 sets an entry point to the patch and sets the state to be equal to patch (act 560). If it isn't, the line counter is increased (act 550), and the next line is read (act 505). In case 545, the patch generator 115 sets an exit point from the patch, sets the state to be equal to "Original," and adapts the command attributes (act 565).

In this way, the state parameter value is either "Original" if the previous line of foo' is part of the original code, or "Patch" if the previous line of foo' is part of the patch code. The current line is determined according to the value of the State parameter. For example, if the previous line was an "Original" line and the current line contains the attribute "jump 150," which differs from the foo attribute of "jump 100," then it is checked to see whether this difference is significant or not. If the change is not considered to be significant, the state remains "Original." If the change is considered to be significant, then we have identified an entry point to the patch, and act accordingly. If the State parameter for the previous line is "Patch," then we check whether the current command is in foo. If the answer is yes, then we set an exit point from the patch, set the State to "Original," and adapt command attributes.

With reference again to the example in FIG. 3, the patch generator 115 identifies three differences between the two assembly codes in this example and compiles the three different portions in the modified assembly code to create a patch file with three different patches (Patch 1, Patch 2, and Patch 3), as well as patch metadata, which, as explained above, contains the entry and exit points to the patch. As mentioned above, the patch generator 115 generates a ROM patch by converting the compiled difference(s) into executable code. In converting the compiled difference(s), the patch generator 115 can use a general file for linking the compiled difference(s) to resolve variables used with the original assembly code. The general file, which can be an object file or a library, defines the correct addresses for various external symbols. In the linking process, the definitions set forth in the general file are used to resolve references to external symbols, assign final addresses to procedures/functions and variables, and revise code and data to reflect this resolution.

FIG. 3 shows that the patch generator 115 gathers multiple patches into a patch file, in other embodiments, the patch generator 115 may decide to merge two adjacent small patches into one big patch. This has the advantage of generating a smaller table of entry points and exit points to and from the patch (but it may come at the expense of generating a larger replacement code in RAM 115). In other embodiments the opposite may be done, where one big replacement code may be partitioned into small patches each with its own entry point and exit point (but it may come at the expense of increasing the managing tables). For example, the patch generator 115 may generate individual patches for each of the developers of a certain project. During integration, the patch generator 115 may determine that the patches exceed their space limits in the memory. In such a case, the patch generator 115 may split large patches to smaller units with a finer resolution such that only changed commands will be included in the patch. This may save RAM at the expense of creating larger tables. If the tables are too big, the patch generator 115 may merge some patches together and save lines in the managing tables of the patches.

Figure 6:
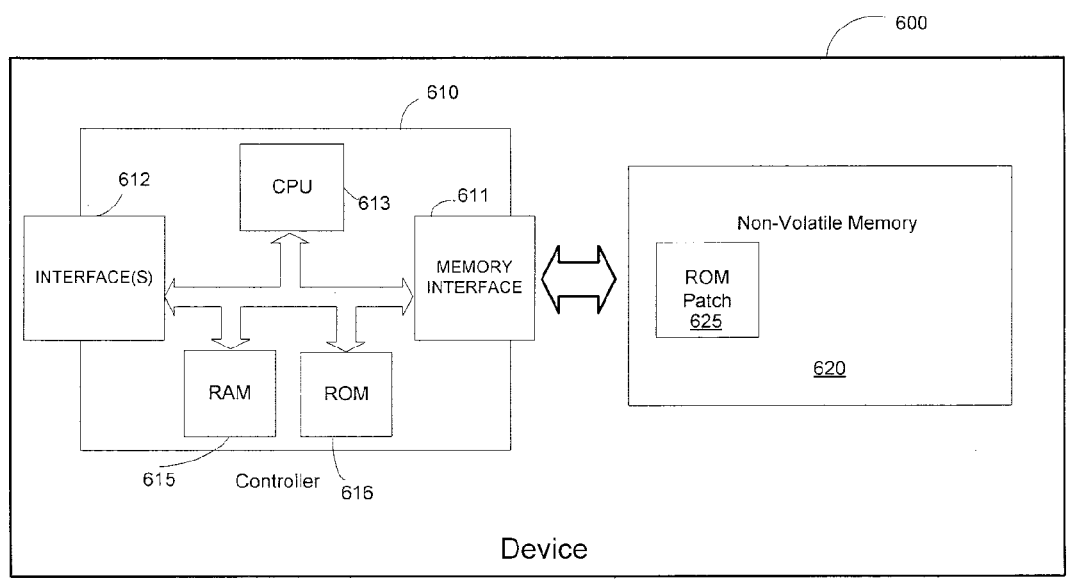
FIG. 6 is a block diagram of a device of an embodiment.

After the computing device 100 generates the ROM patch, the ROM patch is loaded into non-volatile memory of a device. FIG. 6 is a block diagram of a device 600 of an embodiment. As shown in FIG. 6, this device 600 contains a controller 610 and a non-volatile memory 620. The controller 610 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 620 comprises a memory interface 611 for interfacing with the non-volatile memory 620 and interface(s) 612 for placing the device 600 operatively in communication with an external device, such as the computing device 100. As used herein, the phrase "operatively in communication with" could mean directly in communication with or indirectly in (wired or wireless) communication with through one or more components, which may or may not be shown or described herein. The controller 610 also contains a processor/CPU 613, RAM 615, and ROM 616. FIG. 6 also shows that the device's non-volatile memory 620 stores a ROM patch 625, which, as will be explained below, is loaded into the device's RAM 615 during initialization/system boot/start time of the device 600.

The device 600 can be any suitable type of device, including, but not limited to, a storage module (removable or embedded in a host system), a mobile phone, a tablet, a digital media player, a game device, a personal digital assistant (PDA), a mobile (e.g., notebook, laptop) personal computer (PC), or a book reader. With respect to the example of a storage module, the storage module can take the form of a handheld, removable memory device, such as a Secure Digital (SD) memory card, a microSD memory card, a Compact Flash (CF) memory card, or a universal serial bus (USB) device (with a USB interface to the host); a solid-state device; or an embedded device, such as an iNAND™ eSD/eMMC embedded flash drive by SanDisk Corporation. Of course, other types of devices can be used, and the claims should not be limited to a storage module, unless "storage module" is expressly recited therein.

The non-volatile memory 620 can also take any suitable form. For example, in one embodiment, the non-volatile memory 620 takes the form of a solid-state (e.g., flash) memory and can be one-time programmable, few-time programmable, or many-time programmable. The non-volatile memory 620 can also use single-level cell (SLC), multiple-level cell (MLC), triple-level cell (TLC), two-dimensional memory or a three-dimensional memory, or other storage and memory technologies, now known or later developed.

Figure 7:
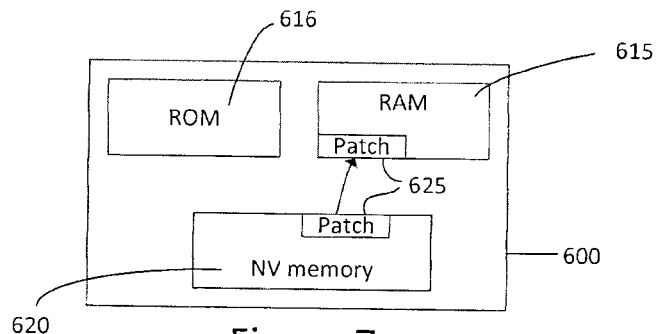
FIGS. 7 and 8 are illustrations of a device of an embodiment loading a ROM patch into RAM.
Figure 8:
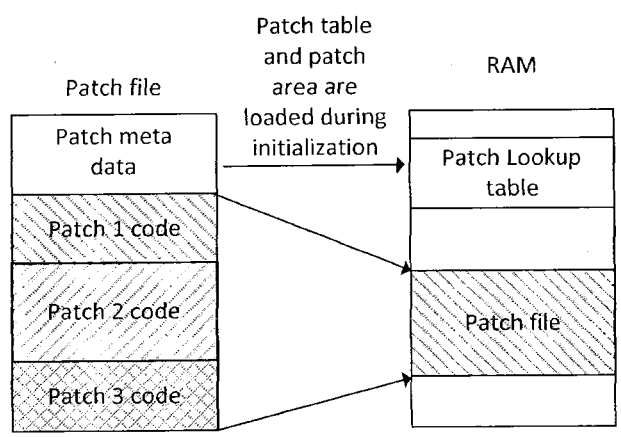

The ROM 616 in the device 600 stores executable code that is executed by the CPU 613 in performing various operations in the device 600 (e.g., read and write operations to the non-volatile memory 620, memory management operations (e.g., garbage collection), and basic boot-up operations of the device 600). The ROM patch 625 is used to replacing some parts of the ROM code. As shown in FIGS. 7 and 8, when the device 600 powers-up/initializes, the ROM patch 625 stored in the non-volatile memory 620 is loaded into RAM 615, and the patch metadata is used to create a patch lookup table in RAM 615. Alternatively, the ROM patch 625 can be received from a network port of the device 600. Additionally, instead of being stored, the ROM patch table can be generated from metadata associated with the ROM patch 625.

In general, to use the ROM patch 625, the device 600 analyzes an address in a command to read a line of the executable code from the ROM 616 to determine if the address is in a ROM patch table. The command is typically generated by the CPU 613, although, in some situations, the command may be received from some external device. If the address is not in the ROM patch table, the line of the executable code is read from the addresses in the ROM 616. However, if the address is not in the ROM patch table, a replacement address (specified in the ROM patch table) is read from the ROM patch 625. The device 600 can also generate a line of executable code with a jump into the replacement address. This embodiment will now be discussed in more detail in conjunction with FIGS. 9-12.

Figure 9:
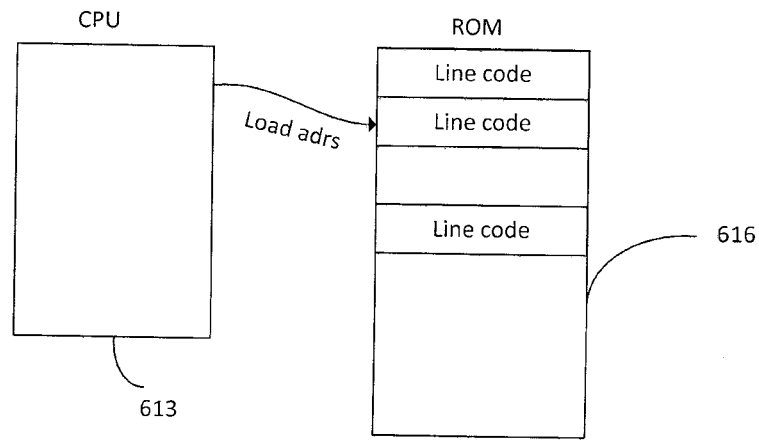
FIG. 9 is an illustration of a CPU of an embodiment reading line code from ROM.
Figure 10:
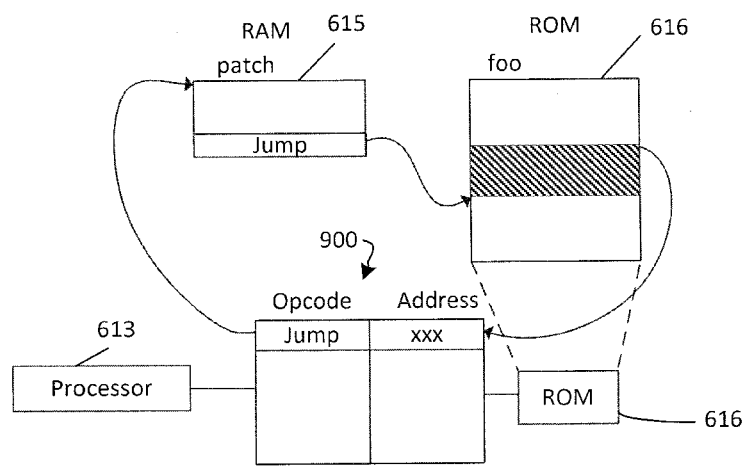
FIG. 10 is an illustration of a use of a ROM patch of an embodiment.

As shown in FIG. 9, a program counter in the device's CPU 613 normally initiates sequential access reads to the ROM 616 to fetch the line code commands, so the CPU 613 can execute them. However, as shown in FIG. 10, when a patch table 900 is used, these fetch operations are intercepted, and the addresses in the fetch operations are compared to the addresses stored in the patch table 900. The patch table 900 has one or more patch entries, where entry includes the address of the first code line (in ROM 616) to be replaced with the patch code and a jump command to the patch code location in RAM 615. Whenever the processor 613 attempts to fetch a code line, the patch mechanism compares the read address with the table entries. If the address does not appear in the patch table 900, the line code is read from the ROM 616 as normal. However, if the address points to the initial address of the obsolete code (in the ROM 616), the patch mechanism returns to the processor 613 the jump command rather than the original code line, so the processor 613 will jump to the location of the patch in the RAM 615 and continue processing from the RAM 615. At the end of the patch, the CPU 613 is commanded to jump to the address in the ROM 616 that follows the patch.

Figure 11:
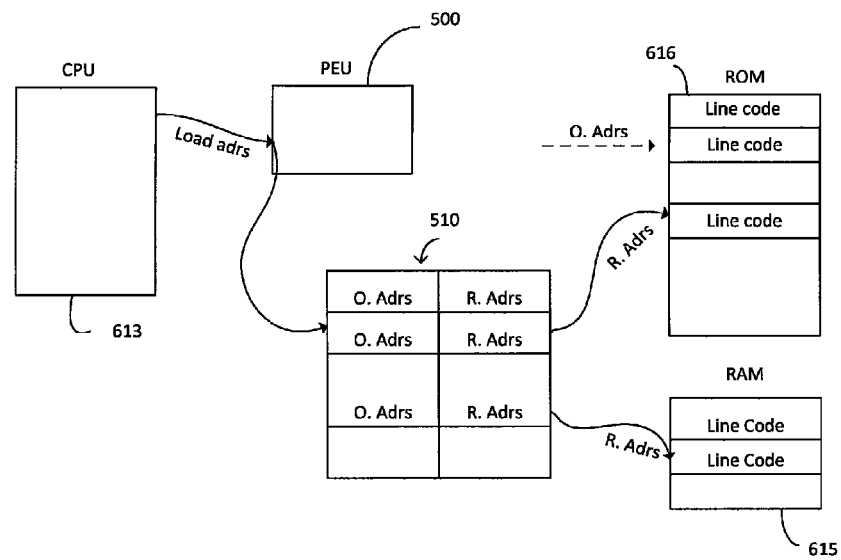
FIG. 11 is an illustration of a use of a patch execution unit of an embodiment.

FIG. 11 is an illustration of one implementation of this embodiment, in which the patch is implemented at run time by a Patch Execution Unit (PEU) 500 between the CPU 613 and the ROM 616. The PEU 500 includes a table of addresses 510. Whenever the program counter in the CPU 613 initiates an access to a certain address, the PEU 500 will search and see if the address is stored in the PEU 500. Addresses that are stored in the PEU 500 are associated with patch code, and addresses that are not stored in the PEU 500 are associated with original code. When the CPU 613 accesses addresses that are not stored in the PEU 500, execution continues as would have been done without a PEU 500 between CPU 613 and ROM 616.

Figure 12:
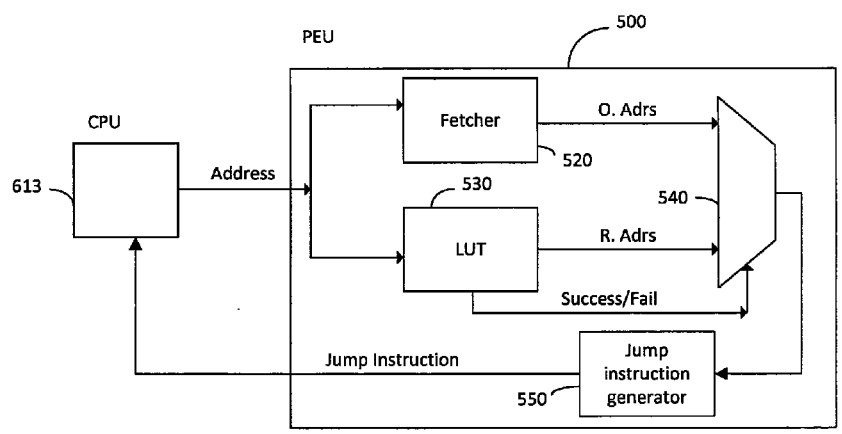
FIG. 12 is an illustration of components of a patch execution unit of an embodiment.

FIG. 12 is an illustration of one implementation of the PEU 500. As shown in FIG. 12, the CPU 613 generates an address for the next command to be executed and transfers the command to the PEU 500. In the PEU 500, a fetcher unit 520 determines the location of the command and reads the command from this location. In parallel, the address is sent to a lookup table unit (LUT) 530 to see if a replacement command should be executed instead of the original command. If the address was found to be in the LUT 530, then a success indicator is generated; else, a fail indicator is generated. In case of success, a replacement command is read from the LUT 530. A multiplexor unit 540 chooses the original command or the replacement command according to the indicator value, and the result is input to a jump instruction generator 550 to generate the correct jump relative to the present position. This jump is returned to the CPU 613 for execution. (In general, the LUT 530 may include other replacement commands, not just jump commands.)

This embodiment avoids the disadvantages of prior systems in which there is only one op-code for all the addresses in the PEU. In case that an address requested by the processor is included in the PEU, the PEU will refer to the op-code, which may refer the CPU to an Interrupt Service Routine. In the routine, there will be software code that will cause a detour such that instead of accessing the address requested by the program counter, a new address generated by the routine will be provided, and the program will jump to the new address (which is part of the patch) and execute the command stored in the new address. This method is limited, as it affects the run-time it takes to execute a replacement code, and it is limited to a small number of patches). In general, only a small number of patches may be executed by this mechanism if the hardware table used by the PEU is a content-addressable memory (CAM) and involves latency introduced by the interrupt mechanism implemented in software, as in the prior methods. CAM memory is expensive, consumes high power, and is dedicated for the PEU. Therefore, it is a practical solution only for a small number of patches. Also, the fact that only one op-code is generated for each address in the PEU means that the op-code will refer to an interrupt mechanism that will generate a software code that will differentiate between the different addresses in the PEU, which can be a slow mechanism.

In contrast to using a prior CAM-based mechanism, in one embodiment, the patch address table 510 used by the PEU 500 to identify addresses in the patch area can address a large number of patches and may be implemented by conventional lookup techniques, such as through a hash table. The table 510 can be relocatable and resizable and can be stored in conventional memory shared by the system for other usage. In one embodiment, each table entry can have the following syntax pair: <Original Address, Replacement Address>. With this syntax, the hardware core of the PEU 500 no longer has to store the addresses of the patch but can refer to the hash table memory. Whenever an Original Memory address is fetched by the processor 613, the PEU 500 can refer to an op-code generator, which will generate a jump command to the address of the Replacement Address that is associated with the Original Address. So, the command that will be executed by the CPU 613 will be the command stored at the Replacement Address and not the command stored in the Original Address. The Replacement Address may be an address in the ROM 616 but different than the Original Address, but it may also be an address in RAM 615. The former may be the case when the modified code performs the same commands as the original code but according to a different order. The latter is typical of a case where new commands were introduced by the patch, and these commands are not stored in any of line codes of the original ROM 616. In general, the hash table can include other entries instead of the Replacement Address, and the Op-code generator can be configured to generate other commands other than jump to Replacement Address.

In any event, the patch table of these embodiments can provide flexibility in exiting the patch. For example, at the end of the patch, the patch table can instruct the processor to return to the very next address in the ROM 616 that would follow the code that was replaced by the patch. Alternatively, the patch table can point to an address other than that which immediately follows the last address of the executable code in the ROM that was replaced by the replacement code. Further, because the patch of this embodiment allow granularity down to a single line of code, the patch table can jump to and from a single line of code that is to be invalidated instead of jumping over an entire function (which has some valid and some invalid lines of code). That is, in this embodiment, the patch jump entries in the table refer to a specific line of code (actual addresses, but not to a function or larger piece of code.

As mentioned above, any type of memory technology can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for using a read-only memory (ROM) patch, the method comprising:
    performing the following in a device comprising read-only memory (ROM) storing executable code:
        analyzing an address in a command to read a line of the executable code from the ROM to determine if the address is in a ROM patch table;
        in response to determining that the address is not in the ROM patch table, reading the line of the executable code from the address in the ROM; and
        in response to determining that the address is in the ROM patch table, reading a replacement address in a ROM patch instead of reading the line of the executable code from the address in the ROM, wherein the replacement address is specified in the ROM patch table;
    wherein the ROM patch is generated by:
        obtaining an original assembly code and a modified assembly code which is a modified version of the original assembly code, the original assembly code being used for an executable code which is stored in the ROM of the device;
        comparing the original assembly code and the modified assembly code to identify difference(s) in the modified assembly code with respect to the original assembly code;
        compiling the difference(s);
        converting the compiled difference(s) into a replacement executable code for some of the executable code stored in the ROM of the device; and
        modifying an address in a jump command in the modified executable code to point to an address in the original assembly code, if the address in the original assembly code contains the same data as the address in the jump command.

2. The method of claim 1, wherein the device further comprises a read access memory (RAM) and a non-volatile memory, the non-volatile memory storing the ROM patch, and wherein the method further comprises loading the ROM patch from the non-volatile memory into RAM.

3. The method of claim 1 further comprising receiving the ROM patch from a network port.

4. The method of claim 1 further comprising generating the ROM patch table from metadata associated with the ROM patch.

5. The method of claim 1 further comprising generating a line of executable code with a jump into the replacement address.

6. The method of claim 1, wherein the device further comprises a patch execution unit that determines if the address is in the ROM patch table.

7. The method of claim 6, wherein the patch execution unit comprises a fetcher, a look-up table, a multiplexor, and a jump instruction generator.

8. The method of claim 1, wherein the ROM patch table is stored as a hash table.

9. The method of claim 1, wherein the ROM patch replaces individual lines of code rather than complete functions.

10. The method of claim 1, wherein the device is a storage module.

11. The method of claim 10, wherein the storage module is embedded in a host.

12. The method of claim 10, wherein the storage module is removably connected to a host.

13. The method of claim 1, wherein the device comprises a non-volatile memory that has a three-dimensional configuration.

14. A device comprising:
    read-only memory (ROM) configured to store executable code; and
    a patch execution unit configured to
        analyze an address in a command to read a line of the executable code from the ROM to determine if the address is in a ROM patch table;
        in response to determining that the address is not in the ROM patch table, read the line of the executable code from the address in the ROM; and
        in response to determining that the address is in the ROM patch table, read a replacement address in a ROM patch instead of reading the line of the executable code from the address in the ROM, wherein the replacement address is specified in the ROM patch table;

wherein the ROM patch is generated by:
obtaining an original assembly code and a modified assembly code which is a modified version of the original assembly code, the original assembly code being used for an executable code which is stored in the ROM of the device;
comparing the original assembly code and the modified assembly code to identify difference(s) in the modified assembly code with respect to the original assembly code;
compiling the difference(s);
converting the compiled difference(s) into a replacement executable code for some of the executable code stored in the ROM of the device; and
modifying an address in a jump command in the modified executable code to point to an address in the original assembly code, if the address in the original assembly code contains the same data as the address in the jump command.

15. The device of claim 14, further comprising: a read access memory (RAM) and a non-volatile memory, the non-volatile memory storing the ROM patch, and wherein the ROM patch is loaded from the non-volatile memory into RAM.

16. The device of claim 14, wherein the ROM patch is received from a network port.

17. The device of claim 14, wherein the ROM patch table is generated from metadata associated with the ROM patch.

18. The device of claim 14, wherein the patch execution unit is further configured to generate a line of executable code with a jump into the replacement address.

19. The device of claim 14, wherein the patch execution unit comprises a fetcher, a look-up table, a multiplexor, and a jump instruction generator.

20. The device of claim 14, wherein the ROM patch table is stored as a hash table.

21. The device of claim 14, wherein the ROM patch replaces individual lines of code rather than complete functions.

22. The device of claim 14, wherein the device is a storage module.

23. The device of claim 22, wherein the storage module is embedded in a host.

24. The device of claim 22, wherein the storage module is removably connected to a host.

25. The device of claim 14 further comprising a non-volatile memory having a three-dimensional configuration.

* * * * *

UNITED STATES PATENT AND TRADEMARK OFFICE
CERTIFICATE OF CORRECTION

PATENT NO. : 9,626,179 B2
APPLICATION NO. : 14/336528
DATED : April 18, 2017
INVENTOR(S) : Bar-Or It is certified that error appears in the above-identified patent and that said Letters Patent is hereby corrected as shown below:

In the Claims

In Column 12, Claim 1, Line 16, before "executable code to" replace "modified" with --replacement--.

In Column 13, Claim 14, Line 16, before "executable code to" replace "modified" with --replacement--.

In Column 13, Claim 15, Line 21, immediately after "memory (RAM)" insert --;--.

Signed and Sealed this
Tenth Day of July, 2018

Andrei Iancu
*Director of the United States Patent and Trademark Office*